United States Patent Office 3,843,445
Patented Oct. 22, 1974

3,843,445
ASPARAGINASE PRODUCTION
Alma Aranshew Christie, Chorley Wood, Raymond Elsworth, Salisbury, Denis Herbert, Amesbury, and Kenneth Sargeant, Salisbury, England, assignors to Secretary of State for Social Services in Her Britannic Majesty's Government of the United Kingdom of Great Britain and Northern Ireland, London, England
No Drawing. Continuation of abandoned application Ser. No. 50,321, June 26, 1970. This application Feb. 26, 1973, Ser. No. 335,793
Claims priority, application Great Britain, June 27, 1969, 32,554/69
Int. Cl. C12d 13/10
U.S. Cl. 195—66 A     21 Claims

ABSTRACT OF THE DISCLOSURE

In a process for improving the yield of L-asparaginase from a culture of an L-asparaginase producing micro-organism, the step which comprises supplementing the culture medium with an active proportion of at least one of the amino acids selected from the group consisting of glutamic acid, serine, threonine and aspartic acid.

---

This is a continuation of application Ser. No. 50,321, filed June 26, 1970, now abandoned.

This invention relates to improvements in the production of the enzyme L-asparaginase.

The enzyme L-asparaginase (3.5.11 L-asparagine amidohydrolase in the nomenclature of the Internationl Enzyme Commission) has been shown to exhibit anti-tumor activity when separated from guinea pig serum, cultures of either of the bacteria *Escherichin coli* or *Serratia marcescens,* or, as disclosed in our copending patent application 40343/68, when separated from bacteria of the genus *Erwinia,* particularly the species *Erwinia carotovora.*

L-asparaginase extracted from these bacterial sources is at present being used in clinical trials for treating certain types of leukemia and disseminated cancer. The demand for the enzyme has however far exceeded its availability at the present time, its commercial production from *E. Coli* and *S. Marcescens* having been hampered by the low activity level of the enzyme in cultures of these bacteria and the difficulties associated with its extraction.

We have discovered that when at least one of the amino acids aspartic acid, threonine, serine or glutamic acid is admixed with a culture comprising an L-asparaginase producing microorganism supported by a suitable culture medium, the yield of L-asparaginase which may be isolated from the culture may be greatly increased. According to the present invention, therefore, a process for improving the yield of L-asparaginase from a culture of an L-asparaginase-producing microorganism includes the step of supplementing the culture with an active proportion of at least one of the amino acids glutamic acid, serine, threonine or aspartic acid.

L-asparaginase is then extracted from the culture by any convenient cell disruption methods, preferably those processes fully described in our co-pending UK patent application 40344/68.

By "active proportion" is meant a proportion of amino acid sufficient to achieve a marked improvement in the yield of L-asparaginase from a culture of an L-asparaginase producing micro-organism, compared with the yield obtained in the absence of this active proportion in the culture. The minimum active proportion in any particular case will depend of course upon the chosen culture medium, the micro-organism selected and growth conditions, for example whether cultivation is by continuous or batch processess in deep culture.

For batch cutlures we have found that, typically improved yields of enzyme are obtained from L-asparaginase producing micro-organisms when, during the batch culture, the culture medium is supplemented with equivalent to at least 3 mg. of amino acid per ml. of culture and preferably 12 to 30 mg./ml. Supplementation may be carried out in a number of ways. For example all of the supplementing amino acid may be added to the nutritional substrate before cultivation of the L-asparaginase producing micro-organism or during an early stage of cultivation. Alternatively, a relatively low but active proportion of amino-acid may be supplied continuously, or at intervals, during a desired period of cultivation, the rate of supply of amino-acid being arranged to approximate to the rate of its consumption by the microorganism. The latter procedure is normally found to give higher yields of L-asparaginase and, although less convenient to carry out, is preferred. An intermediate procedure, in which the culture is initially supplemented with amino acid and later supplied with further amino-acid when the rate of growth of L-asparaginase becomes slower, also may be advantageous in practice.

Where the said amino acid is supplied continuously or continually to the batch culture in processes in accordance with the invention, the supply rate and total supply should be adjusted so that the equivalent to at least 3 mg. of amino acid per ml. of culture is supplied overall, and preferably about 12 to 30 mg./ml.

Although proportions in excess of about 30 mg./ml. may be used there is generally no advantage to be gained and, indeed, it has been found that the growth of an L-asparaginase producing microorganism may be seriously repressed by excessive proporftions of amino acids.

In a continuous culture process, where culture medium is continuously supplied to a culture vessel containing growing L-asparaginase producing microorganisms, and L-asparaginase separated from the continuosly harvested culture, improved yields may be obtained by using a continuously supplied culture medium supplemented with at least 3 mg. of amino acid per ml. of medium and preferably about 7 to 20 mg./ml. In such continuous culture, of course, the amino-acid in the supplemented culture medium supplied is continuously used and replaced, and the actual concentration of amino-acid in the immediate environment of the growing microorganisms may well in consequence fall considerably below the minimum concentration required in the culture medium supply at any stage of the process without deletrious effect.

Some culture media, particularly complex naturally derived media such as yeast extract may contain minor proportions of one or more of the specified amino acids; the invention resides in the deliberate use of these amino acids in significantly higher active proportions than has occurred hitherto with the result that the yield of L-asparaginase is significantly increased.

In processes in accordance with the invention, the yield of L-asparaginase, in International Units per ml. of culture, may be between about 40% and 600% higher than when a process is carried out in unsupplemented media in otherwise identical conditions. The increase in yield does not result merely from an increase in the number of cells of microorganism which are cultivated in the supplemented media but from an increase in the amount of L-asparaginase produced per cell, that is the enzyme activity per cell of microorganism is increased, and thus the enzyme activity per mg. of protein (specific activity) of the microorganism is increased.

The said amino acid may be provided to the culture in any convenient form. Where the solubility of said acid in water is low it is often advantageous to add the amino acid as a salt or ester hydrochloride which can liberate free amino acid within the substrate. In these circumstances considerable amounts of buffering material may be necessary to suppress liberated ions, as well as to maintain the pH of the culture medium at a level which is suitable for the cultivation of the L-asparaginase-producing micro-organism. Where, for example, the sodium or potassium salt of an amino acid is used, phosphoric acid may be added as the buffering agent. The maximum limit to which amino acid derivatives continue to result in increased yields of enzyme is reached when the L-asparaginase producing micro-organism can no longer grow due to the high concentration of buffering material present. Thus in the presence of some buffering materials, maximum yields may be obtained by the addition of significantly less than 3% weight/volume of added amino acid to the culture volume.

Suitable L-asparaginase producing micro-organisms include the bacteria *Escherichia coli, Serratia macroscens* and in preferred processes in accordance with the present invention plant pathogens of the *Erwinia* genus, such as *Erwinia carotovora, Erwinia aroideae, Erwinia atroseptica* and *Erwinia chrysanthemi*.

Suitable culture media are normally those which contain a source of organic nitrogen, although simple chemically defined media containing nitrogen in inorganic form, and carbon sources such as glucose, glycerol or the like may be used. The cultivation of bacteria belonging to the genus *Erwinia* is usually initiated in admixture with complex nitrogenous media containing peptones, protein hydrolysates, yeast autolysates or the like, but once growth commences the culture medium may be changed by gradual dilution with simple medium and withdrawal of complex media until the bacteria is growing on substantially simple medium. Available media which may be used in processes in accordance with the present invention include yeast extract, corn steep liquor, tryptone, pea steep liquor, fish meal, meat meal, casein, bouillon powder, malt extract, soya bean meal and corn meal.

We believe that certain commercially-available nutritional media, for example some yeast extracts, may contain trace amounts of one or more of the desired amino acids but the usual procedures for sterilisation of the nutritional medium tend to destroy such amino acid content as may be present in the medium. However, use of such media can reduce the proportion of amino-acid which needs to be supplied to a culture of L-asparaginase producing microorganims and, in accordance with a further feature of the invention, at least part of the active proportion of amino acid is provided by a nutritional medium which contains a significant proportion i.e. at least 0.1% by weight, of the desired amino acid.

We have found that the most significant increases in yield of L-asparaginase in processes in accordance with the present invention are obtained when the L-isomers of the said amino acids are used. However the D- or DL-isomers may be used in processes in accordance with the invention, although in general the L-isomers are both cheaper and more readily available.

In preferred processes in accordance with the present invention the preferred amino acid is normally L-glutamic acid, generally used (because of its low water solubility) as its sodium or potassium salt in combination with a suitable buffering agent such as phosphoric acid to suppress liberated sodium or potassium ions. For example when the culture medium for a batch process is a complex medium the optimum addition of the sodium salt of L-glutamic acid is found to be about 2% weight/volume of substrate. Although the percentage concentration of L-glutamic acid (sodium salt) may be increased above about 2%, the increased concentration of phosphoric acid also necessary may begin to adversely affect the bacterial growth. Typically, in a batch process wherein *Erwinia carotovora* is grown in admixture with a Yeatex (yeast extract) substrate, the initial addition to the culture of about 2% of sodium salt of L-glutamic acid may bring about an approximately five-fold increase in yield of L-asparaginase. The addition of 7 to 8 kg. of sodium salt of L-glutamic acid to a 400 litre culture of Yeatex has been found to increase L-asparaginase yield from 7 units of enzyme/ml. to 40 units of enzyme/ml. of culture under normal operating conditions.

For continuous cultures typically a nutrient medium supplemented with about 1.5% of the sodium salt of L-glutamic acid is found to provide the optimum yield of L-asparaginase. For example where a continuous culture medium containing about 5% Yeatex supplemented with about 1.5% of the sodium salt of L-glutamic acid is used, the yield of L-asparaginase may be as high as 80 I.U./ml.

Typical examples of the production of L-asparaginase in accordance with the invention will now be described and compared with otherwise similar processes in which no active proportion of amino acid is added to supplement the culture.

EXAMPLE 1

Culture Vessel

The processes hereinafter described were carried out in a stainless steel sterilizable culture vessel provided with a heating jacket and means for controlling the temperature of the contents.

Sterile air inlet ports are provided at the top and the bottom of the culture vessel. The lid, which enables the vessel to be hermetically sealed, has entry ports through which antifoam agent, buffer, seed and supplement may be admitted. A stainless steel stirrer is provided for agitation of the contents of the vessel and a pH control device is included. The pH controller may be set to the required pH value and as pH rises during cultivation a peristaltic pump delivers on demand autoclaved 3.2M phosphoric acid buffer.

Preparation of Seed Culture 150 ml. of Robertson's cooked meat broth was inoculated with a freeze-dried culture of *Erwininia carotovova* (N.C.P.P.B. 7066) and incubated overnight (17 hr.), at 37° C. and stored at 4° C. Roux bottle agar flats (culture surface 10 cm. x 20 cm. containing a broth of 3% Oxoid CM 129 granules solidified with 2.4% of Oxoid agar

TABLE 1

| Harvest, litres | Cell sludge, kg. | Cell cream, litres | l-asparaginase activity, mega-units | | Dry wt., g./l. | Total D.W., kg | $H_3PO_4$, litres | Anti-foam, litres | $CO_2$, max. percent [1] | g./l. N in— | |
|---|---|---|---|---|---|---|---|---|---|---|---|
| | | | Culture | Cream | | | | | | Medium | Supernatant |
| 375 | 3.91 | 6.81 | 3.42 | 3.50 | 2.80 | 1.05 | 2.4 | 0.2 | 1.6 | 2.30 | 1.90 |
| 355 | 3.52 | 6.18 | 2.80 | 3.05 | 2.72 | 0.97 | 1.65 | 0.93 | 1.5 | 2.01 | 1.74 |
| 375 | 4.45 | 7.76 | 4.08 | 3.92 | 2.90 | 1.09 | 2.4 | 0.50 | 1.6 | 2.21 | 1.96 |
| 390 | 4.34 | 7.56 | 2.70 | 3.46 | 2.95 | 1.15 | 2.4 | 0.55 | 1.6 | 2.09 | 1.89 |
| 380 | 3.09 | 5.55 | 1.54 | 1.79 | 2.10 | 0.80 | 1.08 | 1.25 | 1.5 | 2.21 | 1.93 |
| 390 | 4.14 | 7.21 | 3.10 | 3.32 | 3.0 | 1.17 | 2.34 | 0.15 | 2.0 | 2.13 | 1.85 |
| 380 | 4.08 | 7.21 | 3.05 | 3.85 | 2.9 | 1.10 | 2.50 | 0.15 | 2.25 | 2.21 | 1.93 |
| 355 | 4.22 | 7.43 | 3.00 | 3.98 | 3.14 | 1.14 | 2.40 | 0.36 | 2.3 | 2.55 | 2.04 |
| 360 | 4.11 | 7.13 | 3.19 | 3.52 | 2.96 | 1.07 | 2.40 | 0.80 | 1.7 | 2.46 | 2.02 |
| 375 | 4.20 | 7.40 | 3.75 | 4.29 | 2.37 | 0.89 | 2.45 | 0.200 | 2.3 | 2.42 | 2.07 |

[1] This is the peak reading of the $CO_2$ analyser on effluent air stream.

NOTE.—Average enzyme activities:
In culture: 8.2 I.U./ml.
Based on dry weight: 2.9 I.U./mg. dry cells.
Based on protein, assuming that protein is 70% of D.W.: 4.1 I.U./mg. protein.

No. 3) were inoculated with 5 ml. of broth culture and incubated at 37° for 12 hr., and again stored at 4° C. for up to 4 weeks. Immediately prior to use, four Roux bottles were washed off with ml. of distilled water into a seed bottle and made up to 550 ml. with distilled water. The contents of the seed bottle were used to inoculate 15 liters of sterile medium (525 g. of light grade Yeatex, 3.5%) adjusted to 6.8–7.0 before sterilization and preheated to 37° C. before use. Incubation for 12 hr. at 37° C. in a water bath with an aeration rate of 12 litres/min. through a ¼ in. bore pipe yielded the seed in a form suitable for addition to sterile culture media in the culture vessel.

Preparation of the culture medium

The culture medium is prepared by the following process: 36 lb. of Yeatex (English Grains Co. Ltd.) is dissolved in 50 litres of hot tap water, stirred and transferred to tap water contained in a sterile culture vessel to make the volume up to 369 litres. Caustic soda (0.5 litres of 10 N) is added to adjust the pH to 6.8–7. The medium is immediately sterilised by stirring for 30 min. at 121° C., temperature being controlled by a steam jacket, steam injection of purging. The medium is then cooled, the vessel pressure being maintained above atmospheric by admitting sterile air. Temperature and pH are adjusted to 37° C. and pH 6.8–7.0 respectively and an antifoam supply connected. The anti-foam is 25 vol. percent aqueous silicone MS emulsion RD (trademark of Hopkin and Williams Ltd.) autoclaved and supplied aseptically to the culture vessel lid. The pressure in the culture vessel is released and 10 litres/min. of sterile air is supplied to the medium through the entry tube at the bottom of the culture vessel. The medium is circulated by the impeller at the rate of 385 rev./min.

Production of L-asparaginase

Fifteen liters of seed is then transferred to the culture vessel through a port in the lid. The pH controller is set to give a pH value of 6.8 to 7 and the temperature controller set to 37° C. The course of the process is followed by measuring rate of carbon dioxide evolution and by making enzyme assays.

These assays show that enzyme yield, measured as I.U./ml. of culture, remains stationary after about 8 hrs. in this unsupplemented media, and when this stationary stage is reached the pH and temperature controls are switched off and the air supply changed to the top of the culture vessel to provide a sterile seal. Stirring is continued and the culture cooled to 20° C. in about 1 hr. by circulating chilled water through the jacket. The culture is then centrifuged and the cell sludge transferred to a mixer. A buffer, comprising 10 mM. Tris HCl; 30 mM. sodium chloride and 1 mM. ethylenediamine tetra-acetic acid, at pH 7.0 and 2° C. is creamed with the cell sludge in a proportion of one litre buffer for each 1 kg. of sludge. L-Asparaginase is then extracted from the resulting buffered mixture by the process more fully described in copending Patent Application 4,034,463. This broadly comprises lysing the cells with strong alkali, centrifuging and salt precipitation of the supernatent to isolate the enzyme. The results for 7 culture are shown in Table 1. It will be seen that the average L-asparaginase activity is 8.2 I.U. per ml. in the culture or 2.9 I.U./mg. of dry cells. Assuming that 70% of the dry cell weight is protein, the average L-asparaginase activity is 4.1 I.U./mg. protein.

EXAMPLE 2

Seven batch cultures were grown as in Example 1, but with supplements of between 6.5 kg. and 8 kg. of sodium L-glutamate monohydrate, added as a solution in 40 litres of water to the culture medium before the latter was made up to 369 litres.

In supplemented media there were two main phases of growth, the first corresponding to growth in 4.5% Yentex giving a peak carbon dioxide evolution rate after

TABLE 2

| Harvest, litres | Cell sludge, kg. | Cell cream, litres | l-asparaginase activity | | | | | Dry wt, g/l. | Total Dry wt., kg. | H₃PO₄, litres | Anti-foam, litres | Age at harvest, hrs. | g./l. nitrogen in— | | Sodium l-glutamate monohydrate used, kg. | Final glutamic acid, mg./l. |
|---|---|---|---|---|---|---|---|---|---|---|---|---|---|---|---|---|
| | | | Mega units | | Units | | | | | | | | Medium | Supernat. | | |
| | | | Culture | Cream | Culture, per ml. | Per mg. dry cells | | | | | | | | | | |
| 400 | 10.21 | 18.9 | 16.6 | 13.9 | 41.4 | 4.6 | | 9.04 | 3.62 | 17.35 | .25 | 25 | 4.42 | 4.39 | 8.00 | 40 |
| 385 | 10.26 | 18.3 | 15.4 | 13.4 | 40.0 | 4.4 | | 8.61 | 3.31 | 14.00 | .38 | 21 | 3.79 | 2.78 | 6.50 | 40 |
| 420 | 11.08 | 21.7 | 16.8 | 11.7 | 40.0 | 4.7 | | 8.46 | 3.55 | 13.15 | .35 | 24 | 3.81 | 3.82 | 7.00 | 20 |
| 400 | 11.58 | 19.6 | 16.4 | 13.7 | 41.1 | 5.0 | | 8.34 | 3.34 | 11.75 | .38 | 23 | 3.89 | 3.93 | 7.00 | 40 |
| 406 | 11.91 | 21.4 | 20.5 | 18.4 | 50.6 | 6.4 | | 7.95 | 3.23 | 14.60 | .70 | 20 | 3.75 | 3.67 | 7.25 | |
| 400 | 12.06 | 20.1 | 18.7 | 16.1 | 46.8 | 5.5 | | 8.49 | 3.40 | 14.25 | .55 | 22.5 | 4.00 | 3.92 | 7.25 | |
| 400 | 11.40 | 19.6 | 20.8 | 15.8 | 51.9 | 6.4 | | 8.12 | 3.25 | 14.15 | 1.68 | 21 | 3.90 | 3.68 | 7.25 | |

NOTE.—Average enzyme activities:
In culture: 44.5 IU/ml.
Based on dry wt.: 5.3 IU/mg. dry cells.
Based on protein, assuming that protein is 70% of dry weight: 7.6 IU/mg. protein.

5–6 hrs., the second phase giving a peak carbon dioxide evolution rate after about 18–22 hrs. When carbon dioxide evolution had fallen from this second peak, after 20–25 hrs. growth, harvesting was carried out as for unsupplemented media.

The results for the seven cultures are shown in Table 2. It will be seen that the average L-asparaginase activity is 44.5 I.U./ml. in the culture, or 5.3 I.U. per mg. of dry cells. Again assuming that protein is 70% of dry weight, the average L-asparaginase activity is 7.6 I.U./mg. protein.

Thus the yield per ml. of culture has been improved in accordance with the invention by a factor of more than 5.

EXAMPLE 3

A culture of *Erwinia carotovova* (N.C.P.P.B 1066) was grown in 4.5% Yeatex supplemented with 6.5 kg. sodium L-glutamate monohydrate as in Example 1. Assays were made at stages during the process giving the results tabulated in Table 3.

TABLE 3

| Culture age (hrs.) | Bacterial dry wt. (mg./ml.) | L-asparaginase IU/ml. | L-asparaginase IU/mg. dry cells | Volume of 3.2M. H$_3$PO$_4$ added litres | Percent CO$_2$ in culture effluent gas |
|---|---|---|---|---|---|
| 0 | | | | Nil | 0.10 |
| 1 | | | | Nil | 0.10 |
| 2 | | | | Nil | 0.18 |
| 3 | | | | Nil | 0.55 |
| 4 | | | | 0.45 | 1.30 |
| 5 | | | | 1.40 | 1.35 |
| 6 | 2.70 | 7.3 | 2.7 | 2.10 | 0.80 |
| 7 | | | | 2.20 | 0.60 |
| 8 | | | | 2.20 | 0.55 |
| 9 | | | | 2.75 | 0.60 |
| 10 | | | | 3.50 | 0.65 |
| 11 | | | | 3.88 | 0.60 |
| 12 | 3.84 | 12.9 | 3.4 | 4.25 | 0.60 |
| 13 | | | | 4.80 | 0.70 |
| 14 | | | | 5.15 | 0.85 |
| 15 | | | | 5.90 | 1.05 |
| 16 | | | | 7.40 | 1.35 |
| 17 | | | | 8.90 | 1.85 |
| 18 | 7.47 | 34.0 | 4.6 | 10.40 | 2.05 |
| 19 | | | | 12.15 | 1.95 |
| 20 | | | | 13.45 | 1.50 |
| 21 | 8.61 | 40.0 | 4.6 | 14.00 | 0.50 |

The marked decrease in carbon dioxide evolution at 21 hours shows that the bacterial culture is near the end of a growth period, and although slight growth will continue after this stage there is no further increase in L-asparaginase synthesis.

EXAMPLE 4

The yields of L-asparaginase from 20 litre cultures of *Erwinia carotovova* (N.C.P.P.B 1066) grown in both supplemented and unsupplemented Yeatex and harvested after 20 hrs. were measured and are shown in Table 4. Since Yeatex is reported to contain up to 6.5% L-glutamic acid, the actual glutamic acid content of the solution is higher than with an amino-acid free nutrient medium and therefore an estimated total glutamic acid concentration is shown.

TABLE 4

| Percent yeatex | Percent sodium glutamate added | Amended glutamic acid content | L-asparaginase per ml. of culture (I.U.) | Mg. dry cells/ml. | L-asparaginase (I.U.) per mg. dry cell |
|---|---|---|---|---|---|
| 3.5 | 0.28 | 0.45 | 11.1 | 3.2 | 3.5 |
| 4.3 | 0.34 | 0.55 | 16.7 | 4.0 | 4.2 |
| 4.5 | (¹) | 0.29 | 8.2 | 2.8 | 2.9 |

¹ No addition.

The L-asparaginase content and glutamic acid content of the culture grown in 3.5% Yeatex supplemented with 0.28% of sodium L-glutamate monohydrate were measured at various times during growth and are shown in Table 5.

TABLE 5

| | 4 hr. | 8 hr. | 12 hr. | 16 hr. | 20 hr |
|---|---|---|---|---|---|
| L-asparaginase, IU/ml | | 5.8 | 6.8 | 9.9 | 11.1 |
| Glutamic acid, percent | 0.15 | 0.14 | 0.09 | 0.02 | ᵃ 0.005 |

ᵃ Trace.

It will be seen from these results that L-asparaginase production is enhanced by the addition of L-glutamate and continues until the glutamate is exhausted. It is also clear that a considerable proportion of the glutamic acid present before growth is lost during the first 4 hrs., and this is possibly due to decomposition during the process of medium sterilization.

EXAMPLE 5

A culture of *Erwinia carotovora* (N.C.P.P.B. 1066) was grown in continuous culture in a "Porton Type" continuous culture apparatus as described by Herbert, Phipps and Tempest (Laboratory Practice 1965, *14*, 1150–1161). The stirred fermenter was equipped with automatic equipment for control of temperature and pH, which were maintained at 37° C. and pH 7.0 respectively. The culture medium was 5% Yeatox, either alone or supplemented with the various amounts of L-glutamic acid. Preparation of medium and seed cultures were as in previous examples.

After inoculating the fermenter, containing 5% Yeatex medium, and allowing the culture to grow up batchwise, flow of fresh sterile medium was initiated. The dilution rate D, that is $f/v$ where $f$ is the flow rate (litres/hour) and $v$ is the culture volume (litres), was held constant at D-0.3 hr.$^{-1}$ for several days until steady state conditions were established, as shown by constancy of bacterial dry weight and L-asparaginase levels in repeated samples. The culture medium was then supplemented with 0.5% of L-glutamic acid and new steady state established. Further supplementation to levels of 1% and 1.5% L-glutamic acid were carried out and steady states established. The results of bacterial dry weight and L-asparaginase essays at each steady state and shown in Table 6.

TABLE 6

| Inflowing culture medium | Bacterial dry weight (mg/ml.) | L-asparaginase (I.U./ml.) | I.U./mg. |
|---|---|---|---|
| 5% Yeatex | 2.6 | 24 | 9.2 |
| 5% Yeatex plus 0.5% L-glutamic acid | 5.5 | 48 | 8.7 |
| 5% Yeatex plus 1.0% L-glutamic acid | 8.0 | 62 | 7.3 |
| 5% Yeatex plus 1.5% L-glutamic acid | 9.7 | 80 | 8.5 |

EXAMPLE 6

Batch cultures of *Erwinia carotovora* (N.C.P.P.B. 1066) were grown in a Yeatex medium with and without the addition of supplementing amino acid. The resulting asparaginase yields are shown in Table 7.

TABLE 7

| Culture medium | Asparaginase yield (I.U./ml.) |
|---|---|
| 5% Yeatex | 6.7 |
| 5% Yeatex+1% serine | 10.7 |
| 5% Yeatex+1% aspartic acid | 16.1 |
| 5% Yeatex+1% glutamic acid | 20.2 |

In the examples hereinbefore described a strain of *Erwinia carotovora* deposited with the National Collection of Plant Pathogenic Bacteria, England under N.C.P.P.B. 1066 was used as this species has a particularly high specific activity (that is ratio of enzyme activity to mg. of protein produced).

Other bacteria of the Erwinia genus which have been used in processes in accordance with the invention however include:

*Erwinia aroideae*, N.C.P.P.B. 1274
*Erwinia aroideae*, N.C.P.P.B. 1380
*Erwinia atroseptica*, N.C.P.P.B. 549
*Erwinia carotovora*, N.C.P.P.B. 31

*Erwinia carotovora*, N.C.P.P.B. 312
*Erwinia carotovora*, N.C.P.P.B. 392
*Erwinia carotovora*, N.C.P.P.B. 438
*Erwinia carotovora*, N.C.P.P.B. 468
*Erwinia carotovora*, N.C.P.P.B. 491
*Erwinia carotovora*, N.C.P.P.B. 569
*Erwinia carotovora*, N.C.P.P.B. 708
*Erwinia carotovora*, N.C.P.P.B. 898
*Erwinia carotovora*, N.C.P.P.B. 1065
*Erwinia carotovora*, N.C.P.P.B. 1120
*Erwinia carotovora*, N.C.P.P.B. 1280
*Erwinia carotovora*, N.C.P.P.B. 1281
*Erwinia chrysamthem*, N.C.P.P.B. 516

Bacteria of other genera which may be used in processes in accordance with the invention include:

*Escherichia coli*, A.T.C.C. 11303
*Escherichia coli*, M.R.E. 163
*Escherichia coli*, M.R.E. 164
*Escherichia coli*, N.C.T.C. 8164
*Escherichia coli*, N.C.T.C. 8196
*Escherichia coli*, N.C.T.C. 9001
*Serratia marcescens*, N.C.I.B. 1377
*Serratia marcescens*, N.C.I.B. 4612
*Serratia marcescens*, N.C.I.B. 8266
*Serratia marcescens*, N.C.I.B. 8889
*Serratia marcescens*, N.C.I.B. 9155
*Serratia marcescens*, M.R.E. UK/8

A.T.C.C., American Type Culture Collection, U.S.A.
M.R.E., Microbiological Research Establishment, Salisbury, England
N.C.I.B., National Collection of Industrial Bacteria, Aberdeen, Scotland
N.C.P.P.B., National Collection of Plant Pathogenic Bacteria, England
N.C.T.C., National Collection of Type Cultures, U.S.A.

Processes in accordance with the present invention are normally maintained at between 10 and 40° C., preferably 25–35° C. and at a pH of between 6 and 8. The bacteria are normally grown under aerobic conditions but may be produced under anaerobic conditions in suitable circumstances.

L-asparaginase produced in accordance with the present invention from bacteria of the genus Erwinia and extracted and purified as described in our British Patent Application No. 40344/68 conforms to a product named as 3.5.1.1. L-asparagine amido hydrolase in International Enzyme Commission terminology, but appears to differ significantly in properties from previously known L-asparaginases derived, for example, from *Escherichia coli*. Amino acid analysis of samples of L-asparaginase from *E. coli* (produced by Farbenfabriken Bayer A.G.) compared with that from *Erwinia carotovora* gave the following results.

| Amino acid | Esch. coli | Er. carotovora |
|---|---|---|
| Asp | 180 | 131 |
| Thr | 120 | 89 |
| Ser | 60 | 64 |
| Glu | 84 | 80 |
| Pro | 48 | 49 |
| Gly | 108 | 123 |
| Ala | 120 | 105 |
| Val | 120 | 98 |
| CyS | 6 | 2 |
| Met | 24 | 33 |
| Ile | 48 | 61 |
| Leu | 84 | 104 |
| Tyr | 54 | 48 |
| Phe | 36 | 27 |
| Lys | 84 | 67 |
| His | 12 | 25 |
| Arg | 36 | 68 |
| Trp | 12 | 0 |

Similarly, comparative measurements of the Iso-electric point (by Iso-electric focussing) gave about pH 5.2 (for *E. coli*) and about pH 8.5 (for *Er. carotovora*); and glutaminase activities of 2–3% of asparaginase activity (for *E. coli*) compared with 5–7% for *Er. Carotovora*). Additionally, the two asparaginases are serologically quite distinct. Antisera raised to each does not cross react with the other asparaginase. The clinical benefit of this is that in cases where treatment with one asparaginase results in the development of sensitivity (an allergic reaction) treatment can be continued with the second asparaginase. Molecular weights of Erwinia-derived asparaginase are normally between about 130,000 and 150,000.

Treatment of leukemia and disseminated cancers is normally carried out by injecting L-asparaginase in a physiological solution such as saline, although it may be possible to achieve oral administrations in some circumstances. A typical solution for intravenous injection comprises a 15 mg./ml. solution of L-asparaginase in physiological saline. Typical dosage rates are between about 0.05 and 5.0 mg. per kg. patient body weight.

I claim:
1. A process for the production of L-asparaginase comprising culturing an L-asparaginase producing micro-organism of the genus Erwinia in a culture medium characterized in that the medium is supplemented with an active proportion, which is 12 to 30 mg. per ml. of culture medium for a batch culture process and 7 to 20 mg. per ml. of culture medium for a continuous culture process of at least one of the amino acids selected from the group consisting of glutamic acid, serine, and aspartic acid, disrupting at least a proportion of the resulting bacterial cells to release L-asparaginase and isolating the released L-asparaginase.

2. The process of claim 1 wherein the micro-organism is *Erwinia carotovora*.

3. The process according to claim 1 wherein the micro-organism is *Erwinia aroideae*.

4. The process according to claim 1 wherein the micro-organism is *Erwinia chrysanthemi*.

5. The process according to claim 1 wherein the micro-organism is *Erwinia atroseptica*.

6. The batch process according to claim 1 in which all of the supplementing amino acid is added to the culture medium prior to the culture process.

7. The batch process according to claim 1 in which all of the supplementing amino acid is added to the culture medium at an early stage of the culture process.

8. The batch process according ot claim 1 in which the supplementing amino acid is added continuously throughout the culture process.

9. The batch process according to claim 1 in which the supplementing amino acid is added at intervals throughout the culture process.

10. The process according to claim 1 in which the culture medium contains sources of nitrogen and carbon.

11. The process according to claim 1 in which the nitrogen is supplied in inorganic form and the carbon source is glucose.

12. The process according to claim 1 in which the nitrogen is supplied in inorganic form and the carbon source is glycerol.

13. The process according to claim 10 in which the sources of nitrogen and carbon are selected from the group consisting of peptones, protein, hydrolysates and yeast hydrolysates.

14. The process according to claim 1 in which the said amino acid is added as a salt or ester hydrochloride which can liberate free amino acid within the culture.

15. The process according to claim 14, in which the amino acid is added as its sodium or potassium salt.

16. The process according to claim 15 in which phosphoric acid is added as a buffering agent.

17. The process according to claim 1 in which the L-isomers of said amino acids are used.

18. The process according to claim 1 in which the temperature is maintained between 10° C. and 40° C.

19. The process according to claim 18 in which the temperature is maintained at between 25° C. and 35° C.

20. The process according to claim 1 in which the pH is maintained between about 6 and 8.

21. The process according to claim 1 which is carried out under aerobic conditions.

UNITED STATES PATENTS

| | | | |
|---|---|---|---|
| 3,616,230 | 10/1971 | Roberts et al. | 195—66 A |
| 3,440,142 | 4/1969 | Teller | 195—66 A |
| 3,686,072 | 8/1972 | Herbert et al. | 195—66 A |
| 3,589,982 | 6/1971 | Peterson et al. | 195—66 A |

OTHER REFERENCES

Roberts et al.: Journal of Bacteriology, vol. 95, No. 6, pp. 2117–2123 (1968).

Cedar et al.: Journal of Bacteriology, vol. 96, No. 6, pp. 2043–2048 (1968).

LIONEL M. SHAPIRO, Primary Examiner

UNITED STATES PATENT OFFICE
CERTIFICATE OF CORRECTION

Patent No. 3,843,445              Dated October 22, 1974

Inventor(s) CHRISTIE et al

It is certified that error appears in the above-identified patent and that said Letters Patent are hereby corrected as shown below:

Col. 1, line 33, change "Escherichin" to --- Esherichia ---;
Col. 2, line 32, change "proporftions" to --- proportions ---;
Col. 2, line 47, change "deletrious" to --- deleterious ---;
Col. 3, line 16, change "macroscens" to --- marcescens ---;

Col. 4, line 55, change "7066" to --- 1066 ---;
Col. 5, line 4, insert --- 50 --- between "with" and "ml";
Col. 5, line 58, change "4,034,463" to --- 40344/68 ---;
Col. 5, line 75, change "Yentex" to --- Yeatex ---;

Col. 8, line 23, change "Yeatox" to --- Yeatex ---; and
Col. 8, line 31, change "D-0.3" to --- D = 0.3 ---.

Signed and sealed this 3rd day of June 1975.

(SEAL)
Attest:

RUTH C. MASON
Attesting Officer

C. MARSHALL DANN
Commissioner of Patents
and Trademarks